United States Patent [19] [11] 4,359,777
Fox et al. [45] Nov. 16, 1982

[54] HIGH EFFICIENCY TRANSVERSELY EXCITED ELECTRODELESS GAS LASERS

[75] Inventors: Clifton S. Fox, Woodbridge; Jay A. Fox, Alexandria; Dallas N. Barr, Woodbridge, all of Va.

[73] Assignee: The United States of America as represented by the Secretary of the Army, Washington, D.C.

[21] Appl. No.: 227,447

[22] Filed: Jan. 22, 1981

[51] Int. Cl.³ .............................................. H01S 3/03
[52] U.S. Cl. ........................................ 372/61; 372/82
[58] Field of Search ....................... 372/82, 83, 85, 61

[56] References Cited

U.S. PATENT DOCUMENTS 4,085,386 4/1978 Farish et al. ........................ 372/85

Primary Examiner—William L. Sikes
Assistant Examiner—C. J. Britton
Attorney, Agent, or Firm—Nathan Edelberg; Milton W. Lee; Max L. Harwell

[57] ABSTRACT

A high efficiency gas laser which utilizes transverse electrical excitation of a laser gas medium confined in a circular cylindrical volume. Limitation of the excitation energy to only the optical mode volume of the laser eliminates the inefficiency associated with conventional TEA laser technology in which a much larger gas volume is excited for a given optical mode volume. The present invention is comprised of a new design making possible the higher efficiencies through use of dielectric coupling between concave electrodes.

7 Claims, 2 Drawing Figures

HIGH EFFICIENCY TRANSVERSELY EXCITED ELECTRODELESS GAS LASERS

The invention described herein may be manufactured, used, and licensed by the U.S. government for governmental purposes without the payment of any royalties thereon.

BACKGROUND OF THE INVENTION

1. Field of the Invention

The present invention is in the field of dielectric coupling of starter electrodes for traverse electrical excitation of gas laser cavities.

2. Description of the Prior Art

Conventional pulsed transversely excited atmospheric pressure (TEA) gas lasers use metal electrodes which are profiled to provide a uniform electric field for excitation of the gas lasing medium. This results in excitation of a substantially larger volume of gas between the metal electrodes than the limited amount of gas from which optical laser energy is extracted; i.e. from the optical mode volume. When conducting electrodes are used, the only way that a uniform glow discharge, free of arcing and high current streamers, can be obtained is to shape the electrodes such that there are wider gaps at the edges than in the center of the discharge, thus the prior use of convex shaped electrodes. However, a problem exists in that optical energy is extracted only from a small volume with circular cross section centered between the electrodes.

One way to substantially increase the efficiency of pulsed gas lasers is to obtain a closer match between the volume of excited gas and the mode volume of the optical cavity. Previous approaches have been tried with this objective in mind, but have exhibited operational deficiencies. One approach used is coaxial electrode geometry. This type device does not however give a good $TEM_{oo}$ spatial mode output, requires drilling of end mirrors for mounting of the central electrode, and results in a strong radial dependence of volumetric energy deposition.

SUMMARY OF THE INVENTION

The present invention is comprised of a dielectric medium coupling means for excitation of gas laser cavities wherein two metal conductors have a concave surface fitted against an elongated body of dielectric material. The elongated body of dielectric material confines a laser gas medium in a circular cylindrical volume forming an optical mode volume through the length of the elongated body of dielectric material. The dielectric material has outward extensions along its length in diametrically opposite directions and in quadrature to the two concave metal conductors.

The two metal conductors are connected to a switchable high voltage terminal. The application of a high voltage pulse causes space charge build up at the walls of the dielectric material in direct contact with the laser gas medium, thus providing uniform excitation of the laser gas medium.

DETAILED DESCRIPTION OF THE PREFERRED EMBODIMENT

Figure 1:
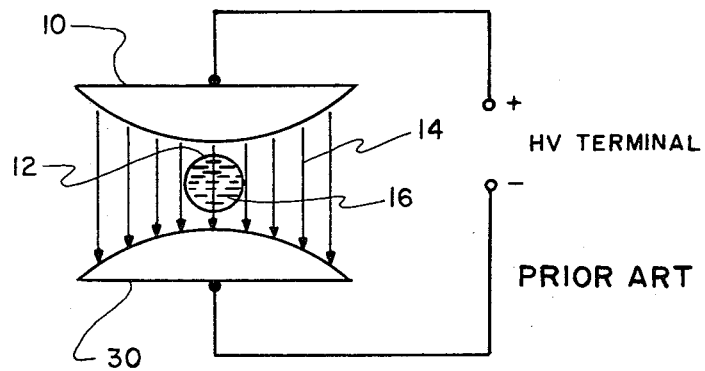
FIG. 1 shows a cross-sectional view of the prior art electrode design for pulsed transversely excited atmospheric pressure gas lasers.

Refer now to FIG. 1 for a discussion of the prior art. Conventional pulsed transversely excited atmospheric pressure gas lasers used metal electrodes which are profiled to provide a uniform electric field for excitation of the gas lasing medium 16 in a mode volume 12. The profile used is a generally convex shape, as shown by electrodes 10 and 30, to prevent arcing at the outer electric field lines 14. Even when arcing did not occur the large volume of gas between electrodes 10 and 30 must be excited before optical laser energy was extracted from the comparatively smaller mode volume 12.

Figure 2:
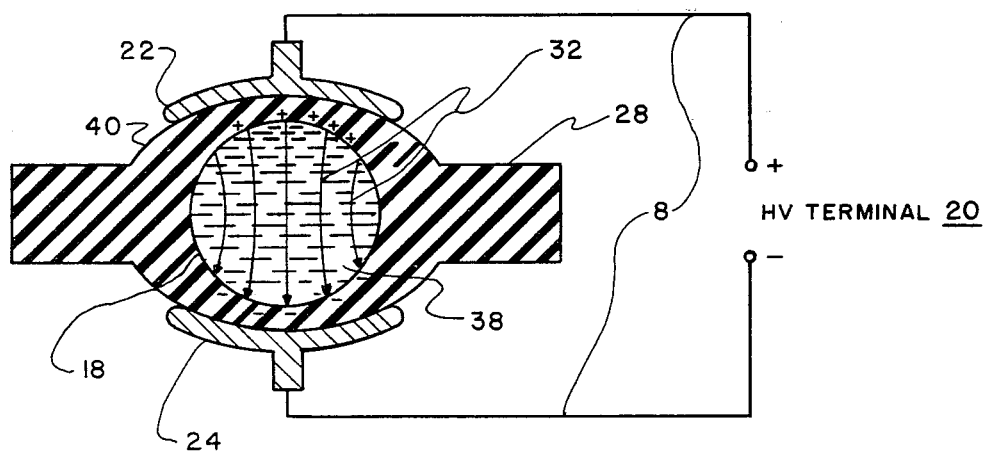
FIG. 2 illustrates a cross-sectional view of the present transversely excited electrodeless gas laser.

The present high efficiency transversely excited electrodeless gas laser, having the laser gas medium 38 enclosed in an elongated body of dielectric material 40 between two concave shaped metal conductors, is shown in FIG. 2. The metal conductors are preferably made of conducting material, such as gold, copper, or aluminum, or other suitable conducting materials that will adhere well to material 40. The dielectric material 40 may be made of barium titanate ($BaTiO_3$), or other suitable high dielectric constant material. The purpose of the concave metal conductors 22 and 24, which are fitted against opposite sides of material 40 along the length thereof, is to establish an electric field, represented by lines 32, directed through the laser gas medium 38. Laser gas medium 38 is confined in a circular cylindrical volume 18 within material 40 and forms the optical mode volume throughout the length of the elongated body of dielectric material. The laser gas medium may be a mixture of carbon dioxide, helium, and nitrogen.

The elongated body of dielectric material 40 is shown in section in FIG. 2, in which the elongated portion would extend perpendicularly into the sheet. Dielectric material 40 has directly opposite outward extensions 28 extending therefrom to provide an extension of the insulative dielectric material 40 and thus prevent stray electrical current leakage between concave metal conductors 22 and 24. Conductors 22 and 24 are positioned in quadrature to these outward extensions 28.

When the high voltage, preferably from 15 to 25 kilovolts, at a suitable high voltage terminal 20 are applied to conductors 22 and 24, space charges are built up at the edges of the dielectric material in contact with the laser gas medium 38, as shown by the polarity signs in FIG. 2. These opposite polarity charges, which are on directly opposite sides of the laser gas medium 38, provide excitation of the laser gas medium 38 to start laser operation.

We claim:

1. A dielectric coupling for excitation of transversely excited electrodeless gas laser to provide a highly efficient gas laser, said coupling comprising:
    an elongated body of dielectric material enclosing a laser gas medium confined in a circular cylindrical volume that forms an optical mode volume through the length of said elongated body of dielectric material, said elongated body of dielectric material having outward extensions along its length in diametrically opposite directions; and
    two concave metal conductors made of a conducting material fitted against opposite sides of said elongated body of dielectric material along the length thereof and in quadrature with said outward extensions, said two concave metal conductors connected to a high voltage at a switchable high voltage terminal whereby high voltage applied to said two concave metal conductors causes space charge build up at the edges of the dielectric material in contact with said laser gas medium to provide excitation of said laser gas medium, said extensions extending a distance outward of said body and along said body sufficient to prevent stray electrical current leakage between said concave metal conductors.

2. A coupling as set forth in claim 1 wherein said dielectric material is made of a high dielectric constant material.

3. A coupling as set forth in claim 2 wherein said high dielectric constant material is barium titanate ($BaTiO_3$).

4. A coupling as set forth in claim 2 wherein said laser gas medium is comprised of a mixture of carbon dioxide, helium, and nitrogen.

5. A coupling as set forth in claim 4 wherein said two concave metal conductors are made of copper.

6. A coupling as set forth in claim 4 wherein said two concave metal conductors are made of aluminum.

7. A coupling as set forth in claim 4 wherein said two concave metal conductors are made of gold.

* * * * *